(12) United States Patent　　(10) Patent No.:　　US 11,811,790 B2
Woo　　　　　　　　　　　　　　(45) Date of Patent:　　　Nov. 7, 2023

(54) ANTI-PHISHING SYSTEM

(71) Applicant: NAMUSOFT CO., LTD, Seoul (KR)

(72) Inventor: Jong Hyun Woo, Seoul (KR)

(73) Assignee: NAMUSOFT CO., LTD, Seoul (KR)

( * ) Notice: Subject to any disclaimer, the term of this patent is extended or adjusted under 35 U.S.C. 154(b) by 546 days.

(21) Appl. No.: 16/618,115

(22) PCT Filed: Nov. 27, 2019

(86) PCT No.: PCT/KR2019/016426
§ 371 (c)(1),
(2) Date: Nov. 28, 2019

(87) PCT Pub. No.: WO2021/107177
PCT Pub. Date: Jun. 3, 2021

(65) Prior Publication Data
US 2021/0336970 A1　　Oct. 28, 2021

(51) Int. Cl.
*H04L 9/40*　　(2022.01)
*G06F 11/14*　　(2006.01)

(52) U.S. Cl.
CPC ...... *H04L 63/1416* (2013.01); *G06F 11/1446* (2013.01); *H04L 63/1483* (2013.01); *G06F 2201/80* (2013.01)

(58) Field of Classification Search
CPC .... G06F 11/1446; G06F 21/554; G06F 21/56; G06F 21/566; G06F 2201/80;
(Continued)

(56) References Cited

U.S. PATENT DOCUMENTS

2004/0210796 A1* 10/2004 Largman ............. G06F 11/1469
　　　　　　　　　　　　　　　　　　　　　714/E11.133
2013/0263226 A1* 10/2013 Sudia ..................... G06F 21/60
　　　　　　　　　　　　　　　　　　　　　　　　726/4
(Continued)

FOREIGN PATENT DOCUMENTS

KR　　　20180016937 A　*　2/2018
WO　　WO-2017014823 A2 *　1/2017　......... G06F 16/3344

OTHER PUBLICATIONS

Shivam Gadhadara, Detection of Ransomware Attacks Using Its Behavior Pattern, Scholarly Research Journal for Interdisciplinary Studies, N. 49366, vol. 4/35, pp. 6734-6746, http://www.srjis.com/pages/pdfFiles/1608035168113.%20Shivam%20Gadhadara%201.pdf (2017-08) (Year: 2017).*

(Continued)

*Primary Examiner* — Theodore C Parsons
(74) *Attorney, Agent, or Firm* — Revolution IP, PLLC

(57) ABSTRACT

Provided is a system for blocking a phishing attack including a phishing attack prevention storage device, and an agent program which is installed in a user terminal or a service server and performs an interworking operation with the phishing attack prevention storage device when the user terminal or the service server is connected with the phishing attack prevention storage device via a network. According to the embodiment of the present invention, when there is an open request for the file stored in the phishing attack prevention storage device from the user terminal or the service server, the phishing attack prevention storage device may check a storage operation mode and create a fake file other than the open-requested original file when the storage operation mode corresponds to a list-only mode to return the fake file to the user terminal or the service server.

4 Claims, 8 Drawing Sheets

(58) Field of Classification Search
CPC ... G06F 2201/825; H04L 63/08; H04L 63/10; H04L 63/14; H04L 63/1416; H04L 63/145; H04L 63/1483; H04L 63/20; H04L 67/1095; H04L 9/40
See application file for complete search history.

(56) References Cited

U.S. PATENT DOCUMENTS

| | | | |
|---|---|---|---|
| 2014/0068270 A1* | 3/2014 | Shenoy | H04L 63/0428 713/182 |
| 2017/0076096 A1* | 3/2017 | Challener | G06F 11/1469 |
| 2018/0203997 A1* | 7/2018 | Charters | G06F 21/568 |

OTHER PUBLICATIONS

Javelin Networks, Honeypots Too Easy for Hackers?, Business Wire, Black Hat Conference 2017, https://www.businesswire.com/news/home/20170724006062/. . . (Jul. 24, 2017) (Year: 2017).*

* cited by examiner

ANTI-PHISHING SYSTEM

BACKGROUND

(a) Technical Field

The present invention relates to a method and a system for blocking a ransomware or phishing attack.

(b) Background Art

As phishing and Ransomware distributed by hackers become more and more diverse, users' data are increasingly threatened. Generally, the phishing refers to an attack that seizes account information or electronic certificates, key data, and the like existing in a user terminal due to attacks that leak data stored in the user terminal. Further, the ransomware is an attack technique that requires money after encrypting the data stored in the user terminal or kept in a connected network storage so as to prevent a user from accessing the data. In recent years, there have been various methods and forms of preventing the user from using a PC terminal by manipulating a disk partition of the terminal from preventing the user from using the data after leaking the data.

As the existing method for coping with the phishing attack, a technique that verifies whether a process that encrypts a storage space in a PC and accesses a corresponding specific storage space is a predetermined process is used, but even though the corresponding storage space is encrypted, there is a case where a file constituting the encrypted storage space is taken and decoded.

In addition, as a conventional method to cope with the ransomware attack, there is a method that brings and uses the backed up data even though the PC is infected with the ransomware by periodically backing up the data in the PC to a safe storage area. However, even with this method, there is a problem that the loss of the file that has been recently worked can not be avoided. As another conventional method, there is a method that registers a process of accessing a file server in advance and enables only a process authorized in the PC to access the data, so as to make the data accessible only to the authorized process in the PC to block, when a process which is not registered in advance accesses the data, the process, thereby preventing a ransomware process from accessing the data. However, this method inconveniences registration of the authorized process in advance, and when a program is installed from time to time, there is also a limit in which the process can not be cumbersome to register every time.

In recent years, there is even a case where the ransomware itself does not encrypt only the data stored in the PC, but encrypts the entire PC or encrypts the entire disk mounted on the PC to require ransom money. Therefore, there is a situation that it is no longer sufficient only by preventing encryption of the data.

In addition, since there is an attack that encrypts not only the PC but also the entire data on a Linux or Unix service server at once, there is a situation in which a fundamental alternative is required. Therefore, in order to prevent the phishing, a new technique is required to block the resulting attack by the PC or service server even if the ransomware is run on the PC or service server while preventing the encrypted storage space created on the PC or service server from being stolen.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art and to provide a method and a system for blocking a ransomware attack for a server capable of safely managing data stored in the server and backup data from ransomware by a low-price and easy method without separate server manager.

Another object of the present invention is to provide a method and a system blocking a phishing attack from the outside to lose data of a user terminal or a service server.

According to an aspect of the present invention, there is provided a system for blocking a ransomware attack as a system for a server for blocking a ransomware attack comprising: a backup storage device which has a purpose for backing up the stored data in a server as a separate storage device which is physically independent from the server and includes a communication interface to enable a communication access to the server; and a service agent which is installed in the server to mediate the communication with the backup storage device, wherein while the backup storage device is storage-mounted on the server, after the data backup to the backup storage device for the storage data in the server is performed, when there is the lock command for the backup data backed up in the backup storage device, the backup storage device locks the corresponding backup data according to the lock command to process the locked backup data to be provided only in an uncorrectable read-only mode.

In one embodiment, the data backup to the backup storage device may be processed only when the backup command for the storage data in the server is made, and when the service agent transmits the backup command received to the server to the backup storage device and the backup storage device may back up the corresponding storage data according to the received backup command.

In one embodiment, when the data correction command received from the server is transmitted from the service agent, the backup storage device may confirm whether target data of the data correction command relates to the locked backup data, and when the target data is confirmed as the data correction command for the locked backup data, the backup storage device may reject the corresponding data correction command.

In one embodiment, when the target data of the data correction command is the locked backup data, even in the case where the locked backup data is storage-mounted on a different storage device from the server, the backup storage device may reject the data correction command for the corresponding backup data received from the different storage device and process the corresponding backup data to be provided only in the read-only mode.

In one embodiment, the backup storage device may include a hardware switch or a software switch for unlocking the locked state set in the backup data, and even in the case where the unlock command for the locked backup data is transmitted through the service agent, when switching to the unlocked state is not performed through an operating switching of the hardware switch or the software switch, the unlock command may be rejected.

In one embodiment, when the switching to the unlocked state is performed by the hardware switch or the software switch, the backup storage device may release the read-only mode for the backup data according to the locked state to switch the corresponding backup data into a data correctable state.

In one embodiment, the switching to the unlocked state may select any one of a batch unlock mode performed for the entire backup data in the backup storage device and a selective unlock mode performed only for the requested backup data.

According to another aspect of the present invention, there is provided a system for blocking a phishing attack comprising: a phishing attack prevention storage device; and an agent program which is installed in a user terminal or a service server and performs an interworking operation with the phishing attack prevention storage device when the user terminal or the service server is connected with the phishing attack prevention storage device via a network and a storage area in the phishing attack prevention storage device is mounted in a network drive form.

Here, when there is an open request for the file stored in the phishing attack prevention storage device from the user terminal or the service server, the phishing attack prevention storage device may check a storage operation mode and create a fake file other than the open-requested original file when the storage operation mode corresponds to a list-only mode to return the fake file to the user terminal or the service server.

In one embodiment, the fake file may have the same file capacity as an original file to be open-requested, and a file text may be filled with a null value or an unknown value.

In one embodiment, the agent program may provide selection information to enable a user to select switching to an edit mode or termination of the edit mode with respect to a folder or file stored in the phishing attack prevention storage device mounted on the user terminal or the service server in a network drive format, and request a release of the list-only mode to the phishing attack prevention storage device when the file open request corresponds to an edit mode open request according to the switching to the edit mode.

At this time, the phishing attack prevention storage device may release the list-only mode according to the edit mode open request and allow the open-requested original file to be provided to the user terminal or the service server.

In one embodiment, the agent program may request a release of the list-only mode to the phishing attack prevention storage device when there is a release request of the list-only mode according to a pre-registered mode from the user terminal or the service server.

At this time, the phishing attack prevention storage device may allow the open-requested original file to be provided to the user terminal or the service server according to the release request of the list-only mode.

Here, the release of the list-only mode may be executed through an authority's authentication by an authentication device pre-registered from the user.

According to the method and the system blocking the ransomware attack according to the embodiment of the present invention, it is possible to safe manage data stored in the server and backup data from ransomware by a low-price and easy method without separate server manager.

According to the method and the system blocking the phishing attack according to the embodiment of the present invention, it is possible to prevent and block a phishing from the outside by using a storage device for phishing prevention which is operable in a list-only mode according to a security policy as a separate storage device which is connected with the user terminal or the service server via a network, but is physically independent.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
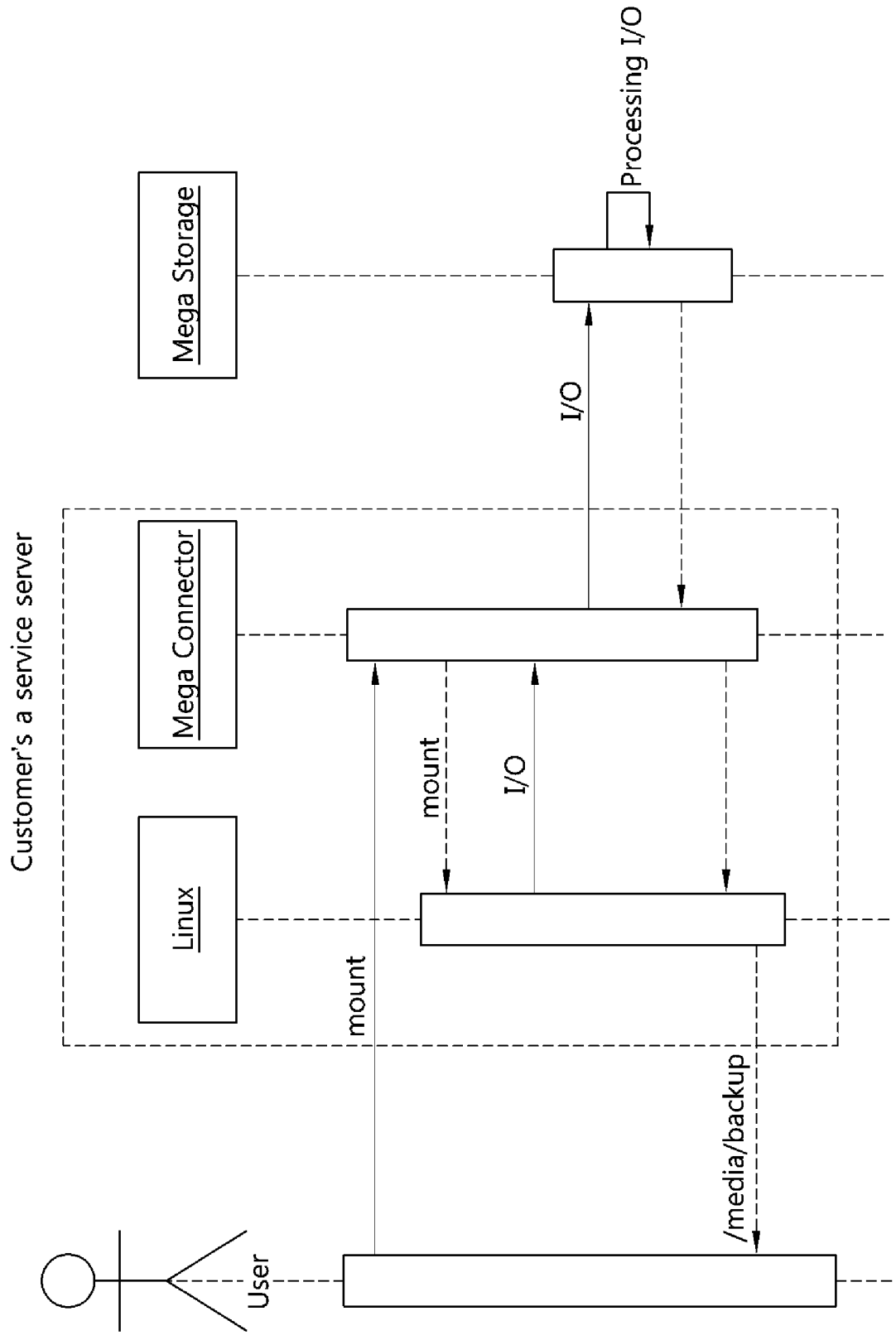
FIG. 1 is a diagram showing a process of storage-mounting a backup storage device on a server in a system for a server for blocking a ransomware attack according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, reference will now be made in detail to various embodiments of the present disclosure, examples of which are illustrated in the accompanying drawings and described below.

As a technical object of the present invention, a system for a server for blocking a ransomware attack will be described (see FIGS. 1 to 3).

Hereinafter, before describing a system for a server for blocking a ransomware attack according to an embodiment of the present invention with reference to FIGS. 1 to 3, to help in the understanding of the present invention, differences between the method of the present invention and other methods will be described as follows.

In conventional prior arts, there is a 'program-based read-only storage" implementation method, which is a technology in which when whether the program is a program authorized on a file protection policy is determined, if there is the authorized program, the correction of the file is enabled, and if not, the program operates only in a read-only mode. In such a program-based read-only storage implementation method, since commands and responses are basically performed by a file unit, a read-only file is provided by a file unit. However, such a program-based read-only storage implementation method has the following weak points.

For example, in the case of Linux operating systems, when an admin account is extorted, since all commands or traffics transmitted to a backup server may be read from a hacker side, the hacker watches the commands transmitted to the backup server and then extorts a fingerprint and the like of the authorized program to perform a replay attack (that is, an attack in which a hacking program is the same name as the authorized program and disguised like a normal program by transmitting the extorted fingerprint value to the backup server), and thus a security method of the technology is neutralized.

On the other hand, according to the present invention, as described above, even though the admin account is extorted, the ransomware attack and the like by the hacker may be blocked. This may be apparently understood from the descriptions for the present invention to be described below.

In another method, there is a "file creation time-based read-only storage" implementation method. This is a method disclosed in Korean Patent Application No. 10-2018-0029490 filled by its company, which is a technology of basically providing a file only in a read-only mode, but admitting the creation of the corresponding file within a predetermined time (that is, a file creation effective time range) based on a creation request time of the corresponding file only in the case where the creation of a new file is required, and further operating a file unit as a basic unit.

However, even in the file creation time-based read-only storage implementation method, in some cases, the following security vulnerability is shown. That is, although a file having a small size (capacity) of the file uploaded in the file creation process is not a problem, in the case of a backup of a file having a large size, the file creation effective time range needs to be increased, but if the time is opened too long, a possibility to be exposed to an external attack may be increased for the time. For example, in the case of the backup, in order to enhance the storage efficiency, the large-sized file is not backed up by one file unit, but is bound and backed up into one file with a Tar or ZIP format, and if the file size is too large, a correctable time of the file needs to be sufficiently much given.

In order to improve the aforementioned problems, in the embodiment of the present invention, a "command-based read-only storage" implementation method is provided. Such a command-based read-only storage implementation method is executed by a backup command, a lock command, and an unlock command, and at this time, the backup/lock/unlock may be operated by a file unit and may be operated by a folder unit. Accordingly, even in the case where there is a correction request for a specific file, when a folder (extended to a higher folder of the corresponding folder) storing the corresponding file is in a locked state according to a path of the corresponding file, the correction request for the corresponding file is rejected.

These backup/lock/unlock commands may use a command structure in accordance with the following commands by the Linux operating system.

Examples of Backup Command

```
User>mount 192.10.1.1 localhost\backup
    (Mkdir \backup\websource_backup_20190805)
    Copy/Backup                '\websource'
'\backup\websource_backup_20190805'
```

Examples of Lock Command
freeze \backup\websource_backup_20190805
Examples of Unlock Command
Melt   thackup\websource_backup_20190805   (OTP 201023)

As described above, in the case of the unlock command, authentication by a one-time password (OTP) may be additionally requested.

As described above, according to the method of the present invention, the backup data may be changed into a read-only mode by locking all files and folders below a specific folder by a very simple console command.

According to the command-based read-only storage implementation method according to the embodiment of the present invention, generally, when the file is required to a mounted drive, a folder path storing the file is included in the corresponding request. As such, when a correction request is limited based on the file and the folder path, there is an advantage of omitting management for unnecessary metadata for each file (a difference between the creation time and a current request time in the case of the creation time-based read-only storage implementation method described above, and attribution information, a fingerprint value, etc. of the corresponding program in the case of the program-based read-only storage implementation method described above).

Hereinafter, embodiments of the present invention will be sequentially described with reference to FIGS. 1 to 3.

A system for blocking a ransomware attack according to the embodiment of the present invention includes a backup storage device (see "mega storage" of FIGS. 1 to 3, same as below) which has a purpose for backing up the stored data in a server as a separate storage device which is physically independent from the server and includes a communication interface to enable a communication access to the server; and a service agent (see "mega connector" of FIGS. 1 to 3, same as below) which is installed in the server to mediate the communication with the backup storage device.

In a system for the server for blocking the ransomware attack of the present invention, the backup storage device provides the same environment as a general storage which is connectable via a network or directly. That is, like a general storage connected by NAS, DAS, SAN, etc., the backup storage device provides mount/unmount and provides an I/O of an operating system as it is so that there is no problem when various backup utilities and tools such as rsync are operated.

Further, a service agent may be installed to be driven in a service level of the operating system in the installation step or driven at any location by registering a program execution environment pass of the operating system.

According to the embodiment of the present invention, while the backup storage device is storage-mounted on the server, after the data backup to the backup storage device for the storage data in the server is performed, when there is the lock command for the backup data backed up in the backup storage device, the backup storage device locks the corresponding backup data according to the lock command to process the locked backup data to be provided only in an uncorrectable read-only mode.

According to the embodiment of the present invention, the data backup to the backup storage device may be processed only when the backup command for the storage data in the server is made, and when the service agent transmits the backup command received to the server to the backup storage device and the backup storage device may back up the corresponding storage data according to the received backup command. This will be described below with reference to FIG. 1. Here, FIG. 1 is a diagram showing a process of storage-mounting a backup storage device on a server in a system for a server for blocking a ransomware attack according to an embodiment of the present invention.

Referring to FIG. 1, the backup storage device (mega storage) refers to a device or server device in which an actual storage device is built-in and a hybrid WORM program is mounted, and the service agent (mega connector) is a module installed in a customer service server to communicate with the backup storage device (mega storage).

A user needs to mount the backup storage device (mega storage) to back up the data of its own service server. A mount request of the user is received and processed by the service agent (mega connector), and various I/Os of the operating system related to a storage mount are processed through the backup storage device (mega storage) and then the service agent (mega connector) returns the result to the operating system.

In an example of FIG. 1, an example in which the backup storage device (mega storage) is mounted on a new folder called backup below a folder called /media.

Figure 2:
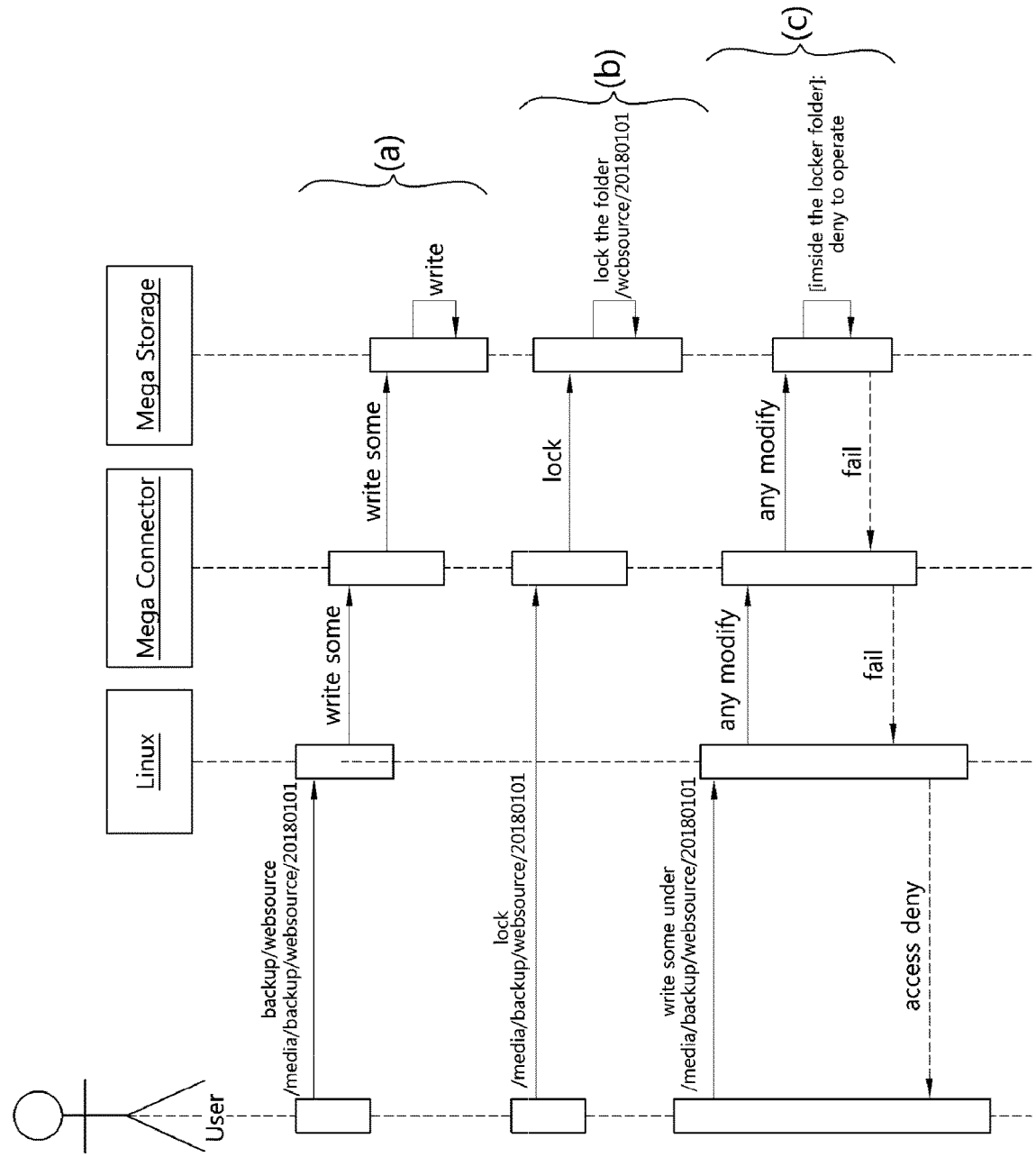
FIG. 2 is a diagram showing a process of backing-up and locking the data by the backup storage device in the system for the server for blocking the ransomware attack according to the embodiment of the present invention.

FIG. 2 is a diagram showing a process of backing up and locking data by the backup storage device.

In the embodiment of the present invention, when the data correction command received from the server is transmitted from the service agent, the backup storage device confirms whether target data of the data correction command relates to the locked backup data, and when the target data is confirmed as the data correction command for the locked backup data, the backup storage device rejects the corresponding data correction command.

Referring to FIG. 2, when the user requests a lock (provided by the service agent (mega connector) after backing up data of /websource to /media/backup/websource/20180101 (see FIG. 2A), the backup storage device (mega storage) locks the corresponding folder and thereafter, operates only in a read-only mode (see FIGS. 2B and 2C).

At this time, the folder of /media/backup/websource/20180101 may be created with a command such as mkdir in the case of the Linux operating system.

Further, information on the locked folders may be stored in a non-volatile memory (such as a database, etc.) of the backup storage device (mega storage), and thus the data may be maintained even if the power supply to the backup storage device is interrupted.

Thereafter, the data correction requests (e.g., a write file, a modify file, a move file, a delete file, etc.) for /media/backup/websource/20180101 all are rejected by the user or any processor including ransomware.

Further, according to another embodiment, when the target data of the data correction command is the locked backup data, even in the case where the locked backup data is storage-mounted on a different storage device from the server, the backup storage device rejects the data correction command for the corresponding backup data received from the different storage device and may process the corresponding backup data to be provided only in the read-only mode.

That is, information on the locked folders is set to a storage reference path (/websource/20180101 in an example of FIG. 1) of the backup storage device (mega storage), and even though the backup storage device is mounted on another path (e.g., /media/data) of another device, /media/data/websource/20180101 may still be implemented accessibly only in the read-only mode.

Figure 3:
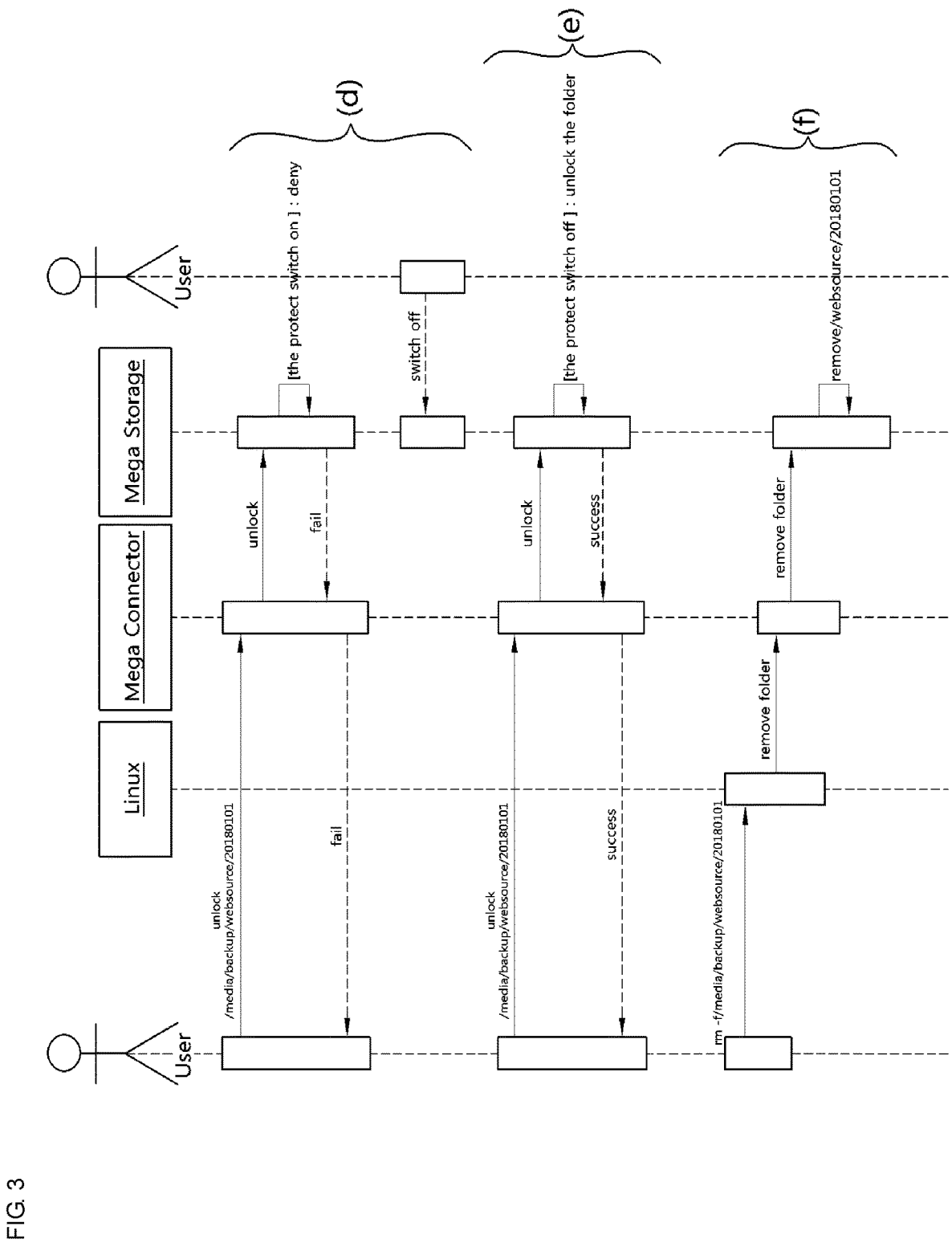
FIG. 3 is a diagram showing a process of releasing the lock by the backup storage device in the system for the server for blocking the ransomware attack according to the embodiment of the present invention.

FIG. 3 is a diagram showing a process of performing the unlocking by the backup storage device.

In the embodiment of the present invention, the backup storage device may include a hardware switch (e.g., a hardware button for locking and unlocking provided in the backup storage device) or a software switch for unlocking the locked state set in the backup data. Accordingly, even in the case where the unlock command for the locked backup data is transmitted through the service agent, when switching to the unlocked state is not performed through an operating switching of the hardware switch or the software switch, the unlock command may be rejected (see FIG. 3D).

Accordingly, when the switching to the unlocked state is performed by the hardware switch or the software switch, the backup storage device releases the read-only mode for the backup data according to the locked state to switch the backup data into a data correctable state (see FIGS. 3E and 3F).

At this time, the switching to the unlocked state is able to select any one of a batch unlock mode performed for the entire backup data in the backup storage device and a selective unlock mode performed only for the requested backup data.

As described above, in the present invention, basically, once-locked folders and files and folders therebelow are accessible only in the read-only mode and may be implemented so that any unlocking is impossible by the user. However, when the locked folders are increased, a writable area of the backup storage device (mega storage) is continuously decreased. Accordingly, an unlocking function is given to reuse the storage, and in the backup storage device (mega storage) of the present invention, the unlocking is performed by an operation of turning off the hardware switch (physical switch (protect switch)) or the software switch. As such, while the corresponding switch (the protect switch) is turned off, a specific folder is able to be unlocked or the entire backup storage device (mega storage) is able to be unlocked. Of course, in addition to an on/off mode of the hardware switch and the software switch, an on/off mode (that is, lock and unlock) using a one time password (OTP) is applicable.

With respect to the locking and unlocking mode described above, various modes may be further present as follows. Hereinafter, various embodiments thereof will be described.

According to an embodiment of the present invention, the locking of the backup storage device may be performed by a mode executed (that is, changed to a read-only mode) only when a pre-specified lock command (ex. a lock command using a freeze command) needs to be input manually, but may be automatically executed according to a predetermined condition. As an example, when a file event coming into the corresponding network drive from a client program installed in the user terminal is a file/folder creation event (ex. create event), the creation of the corresponding file is allowed, or when a termination event (ex. close event) of the corresponding file/folder comes into the network driver, a method of automatically executing locking for the corresponding file/folder may also be applied.

Here, as a C function creating an I/O event closing a file handle, according to the windows OS, two C functions below may be representatively used.

int fclose(FILE *stream)
    BOOL CloseHandle(HANDLE hObject)

Here, as a C function creating an I/O event closing a file handle, according to the Linux/Unix OS, a C function below may be representatively used.

int close(int fd)

As described above, when a program calls API closing the file handle, the I/O event closing the file handle occurs, and the event is transmitted to a file system. In this case, in the Windows, the I/O may be detected by a callback file system (file system driver), and in the Linux, the I/O may be detected by FUSE.

Also, if a specific application is terminated while the file handle is opened, generally, file handles forcibly opened by the OS are closed, and at this time, the same event I/O occurs.

The functions described above are functions used in the C language, and functions closing the file handle are present separately for each language. The corresponding functions generate events to close the file handle to all file systems.

Further, hereinabove, the method for only reading or not the data stored in the backup storage device by a folder unit by the on/off selection using the hardware switch and the like is mainly described. However, as described above, according to a system design method, a method of automatically changing the data to the read-only mode by detecting the termination event of the file is adopted, and while the hardware switch or the like is turned on, even in the case where there is an initialization command of the corresponding disk, a method in which the initialization of the disk is not operated may also be applied.

As a second technical object of the present invention, a system for blocking a phishing attack will be described (see FIGS. 4 to 8).

Hereinafter, before describing a system for a server for blocking a phishing attack according to another embodiment of the present invention with reference to FIGS. 4 to 8, to help in the understanding of the present invention, differences between the method of the present invention and other methods will be described as follows.

According to conventional prior arts, in order to prevent leakage and modification of data stored in user terminals such as a PC and a service server by unknown installation of a malicious program by hackers, a method of storing files required for security due to a file security policy separately in a security storage area, a method of allowing the file to be edited only by an authorized program, or a method of configuring a file in a read-only storage to open the file only in a read-only mode has been used.

However, the method for storing the files separately in the security storage area and the method of allowing the file edition only by the authorized program have a weak point of extorting and simultaneously neutralizing an admin account of the operating system. As such, when the admin account is extorted, since all commands or traffics to be input/output may be read from the hacker side, the hacker watches the corresponding input/output commands and then extorts a fingerprint value and the like of the authorized program and performs a replay attack (that is, an attack in which a hacking program is the same name as the authorized program and disguised like a normal program by transmitting the extorted fingerprint value to the backup server) to neutralize a security mode of the above technology.

Further, even in the case of the method of allowing the file to be configured as a read-only storage and opened only in the read-only mode, the method is strong to the ransomware attack, but the data is able to be leaked by a method of capturing contents of the files opened in the read-only mode, and thus there is a possibility to be neutralized to the phishing attack.

In order to improve the aforementioned problems, in the embodiment of the present invention, provided is a method capable of improving the weak points described above and preventing the data leakage by the phishing attack by using a separate storage device (hereinafter, referred to as a phishing attack prevention storage device) basically operating as a "list-only mode" and physically independent.

Hereinafter, embodiments of the present invention will be sequentially described in detail with reference to the accompanying drawings.

Figure 4:
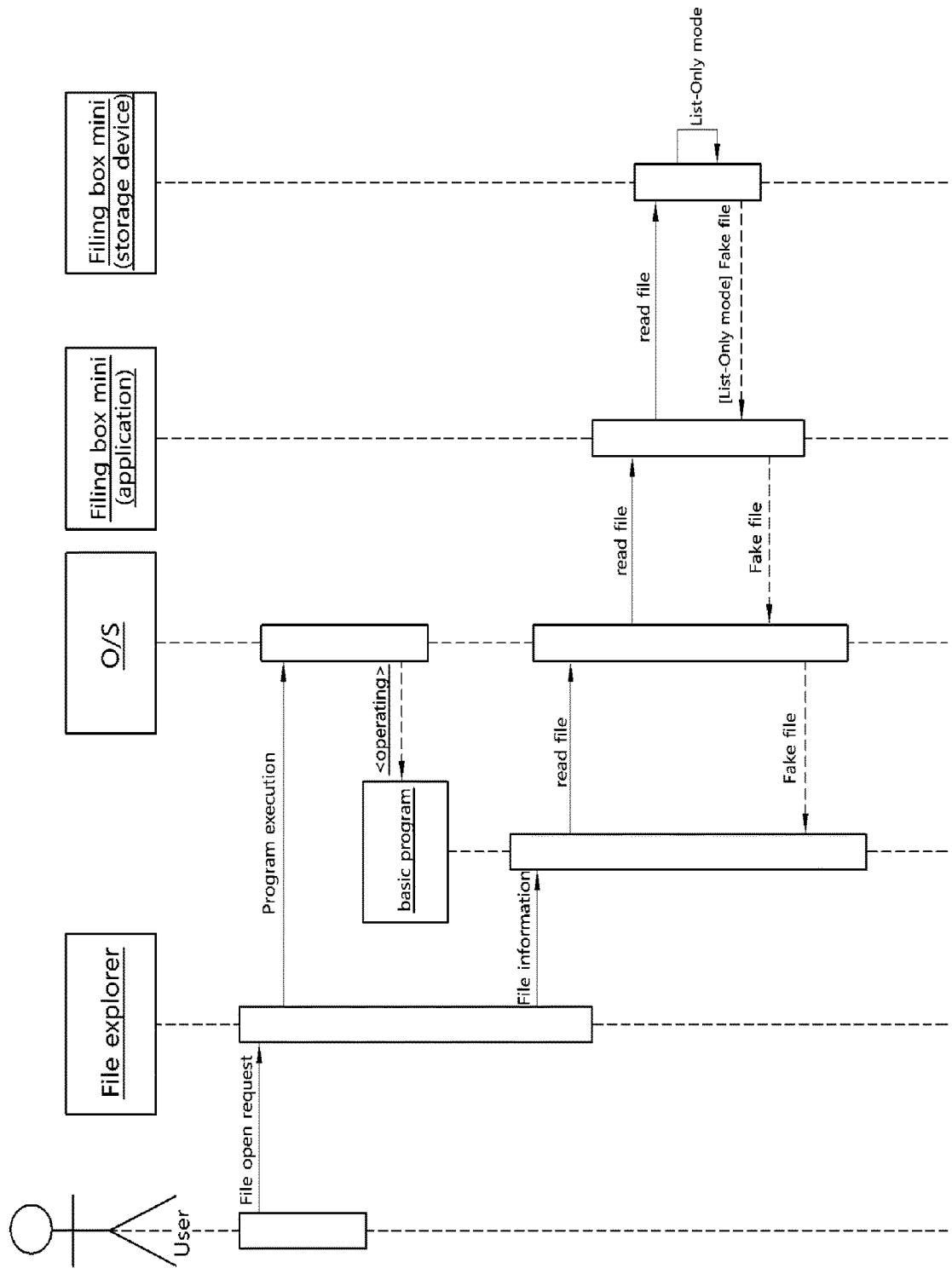
FIG. 4 is a diagram for describing a list-only mode as a basic process according to a method and a system for preventing a phishing attack according to an embodiment of the present invention.

FIG. 4 is a diagram for describing a list-only mode as a basic process according to a method and a system for preventing a phishing attack according to an embodiment of the present invention.

In this specification, for convenience and concentration of description, it will be described based on a case where a user terminal such as a PC is connected with a phishing attack prevention storage device via a network and the entire storage area or a specific storage area of the phishing attack prevention storage device is mounted on the user terminal in a network drive form. However, it will be apparent that the present invention may be equally applied even to a service server based on the Linux or UNIX mounts and uses the storage area of the phishing attack prevention storage device.

Referring to FIG. 4, when the user attempts to open the file in a list-only state by a file explorer, the file explorer executes a basic program (e.g., a basic program WINWORD.EXE to process an extension docx) to process the corresponding file extension and then transmits file information. The basic program is transmitted to the phishing attack prevention storage device (hereinafter, referred to as a filing box mini device) through an agent program (hereinafter, referred to as a filing box mini application or requesting a file read by the operating system and operating as a file system driver.

The filing box mini device checks a list-only mode of the requested file to return fake data (in the case of the list-only mode) and provide the fake data to the basic program. Accordingly, the user finally watches document having the fake data or confirms errors generated by the basic program due to the fake data.

The fake file has the same file capacity as an original file to be open-requested, and a file text may be filled with a null value or an unknown value which cannot determine any meanings.

Figure 5:
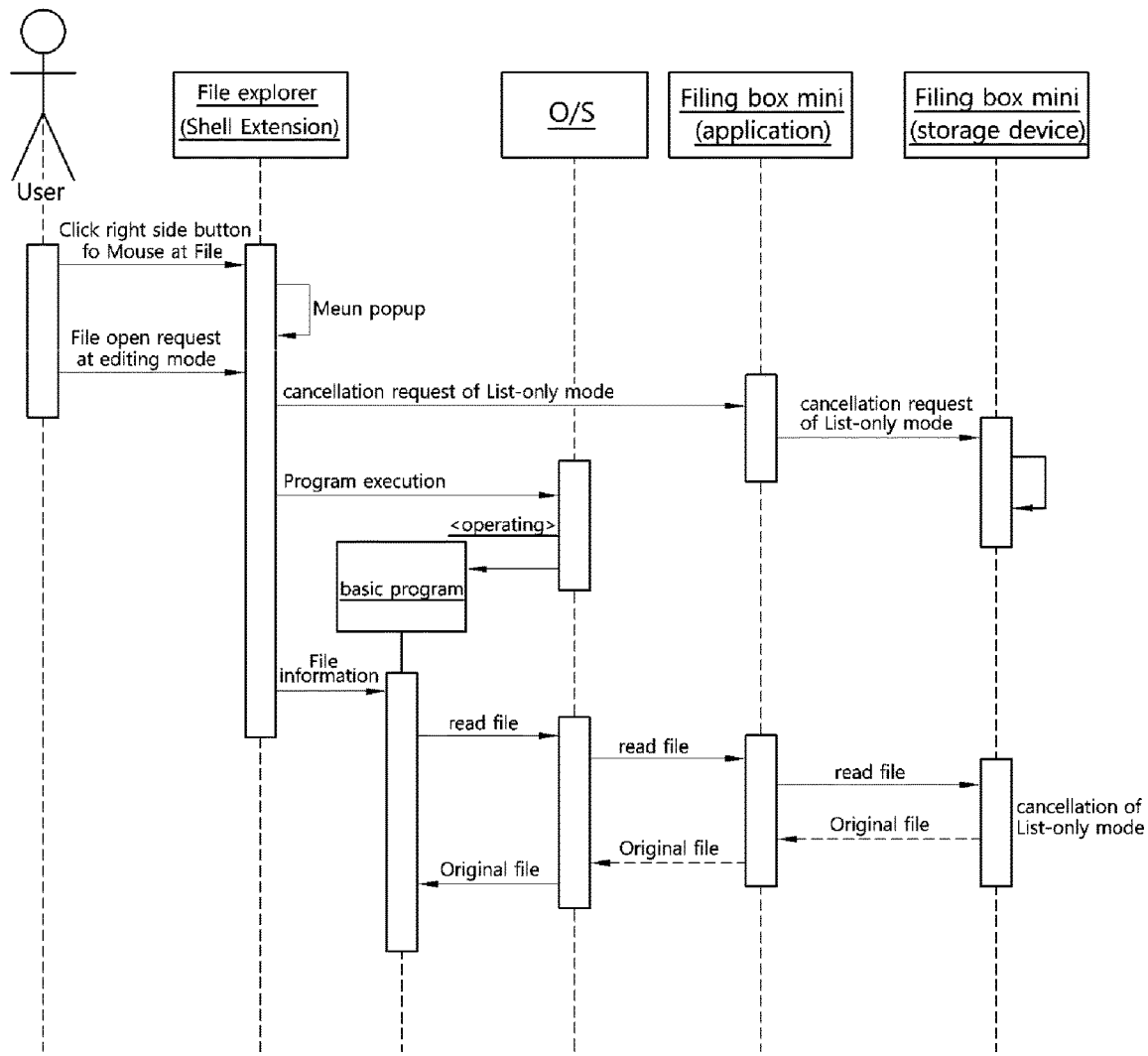
FIG. 5 is a diagram for describing a method for opening a file in an editable state by releasing the list-only mode according to an embodiment of the present invention.

FIG. 5 is a diagram for describing a method for opening a file in an editable state by releasing the list-only mode according to an embodiment of the present invention.

Referring to FIG. 5, after the user selects a specific file in the file explorer, the user clicks a right-side mouse button to pop-up a context menu of a shell extension of the file explorer. Thereafter, when the user selects a menu of 'open to edit mode', the file explorer requests a list-only mode release of the corresponding file to the filing box mini application and the filing box mini application allows the request to be performed to the filing box mini device. When the list-only mode of the corresponding file is normally released, the file explorer executes the basic program to process the extension of the corresponding file and then transmits the file information, and the basic program reads and processes the original data from the filing box mini device through the operating system and the filing box mini application.

Figure 6:
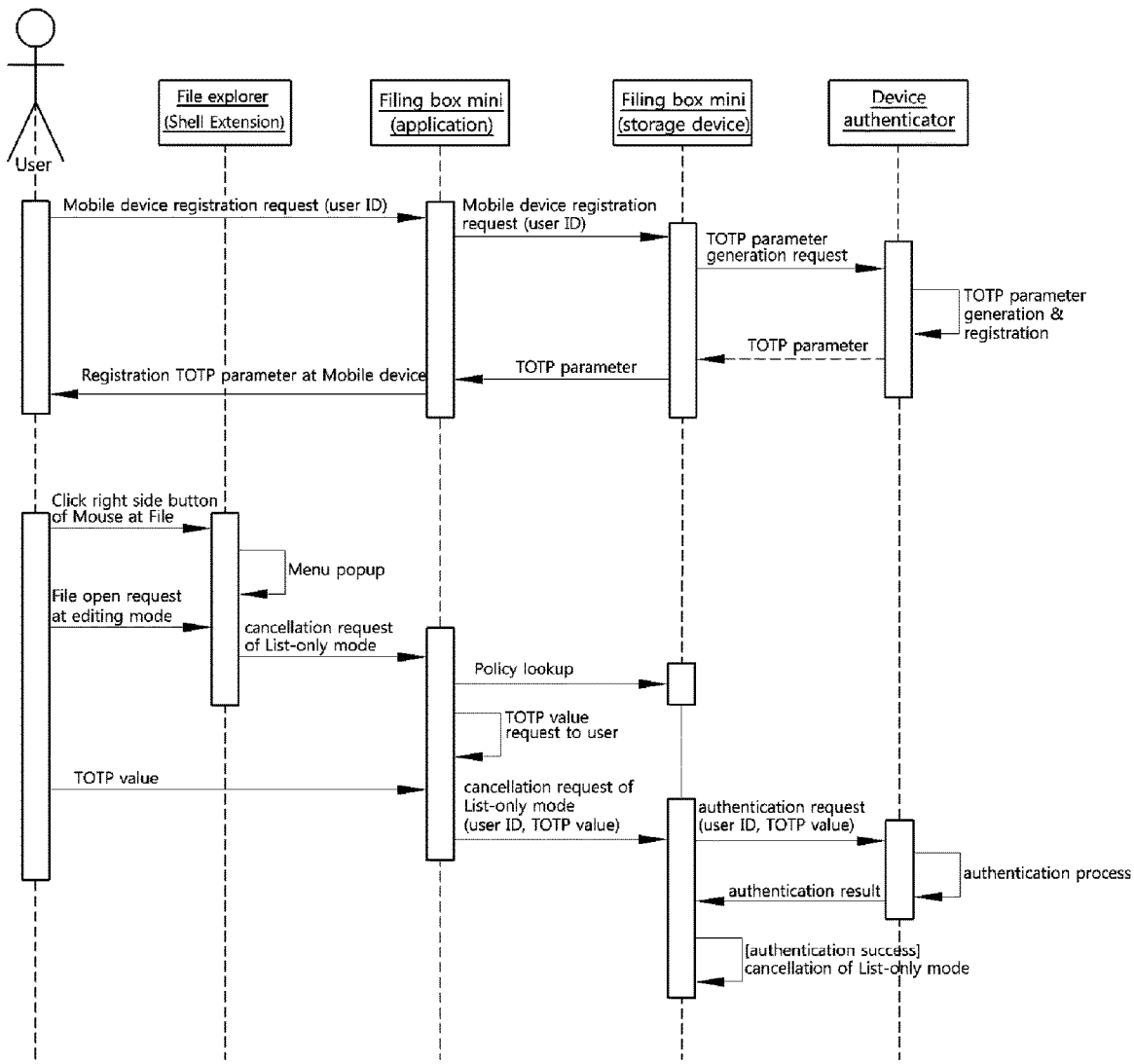
FIG. 6 is a diagram for describing a method for performing additional authentication in the process of releasing the list-only mode according to an embodiment of the present invention.

FIG. 6 is a diagram for describing a method for performing additional authentication in the process of releasing the list-only mode according to an embodiment of the present invention.

Referring to FIG. 6, when the user intends to open the specific file in a usable form, a list-only mode of the corresponding file is released through additional OTP authentication.

The user needs to first register a user's own OTP device (a mobile, etc.) to the filing box mini device once.

The user requests a device registration together with user's own ID through the filing box mini application and the filing box mini device receiving the request requests creation and registration of a new TOTP parameter to be used in the corresponding user's ID to an internal device authentication unit. Normally, the TOTP parameter registered in the device authentication unit is transmitted to the filing box mini application to be exposed to the user. When the user registers the corresponding TOTP parameter to user's own OTP device, the initial OTP device registration process is completed.

Thereafter, the user selects the specific file in the file explorer and then clicks the right-side mouse button to pop-up a context menu of the file explorer (shell extension), and thereafter, when the user selects the menu of 'open to edit mode', the filing box mini application inquires an authentication policy from the filing box mini device to recognize that the OTP authentication is required and requests a TOTP value to the user. The user obtains the TOTP value from the user's own OTP device to provide the obtained TOTP value to the filing box mini device and the filing box mini device receiving the value requests the authentication to the internal device authentication unit. When the authentication is successful, the filing box mini device releases the list-only mode of the corresponding file to change the file to a usable state.

Figure 7:
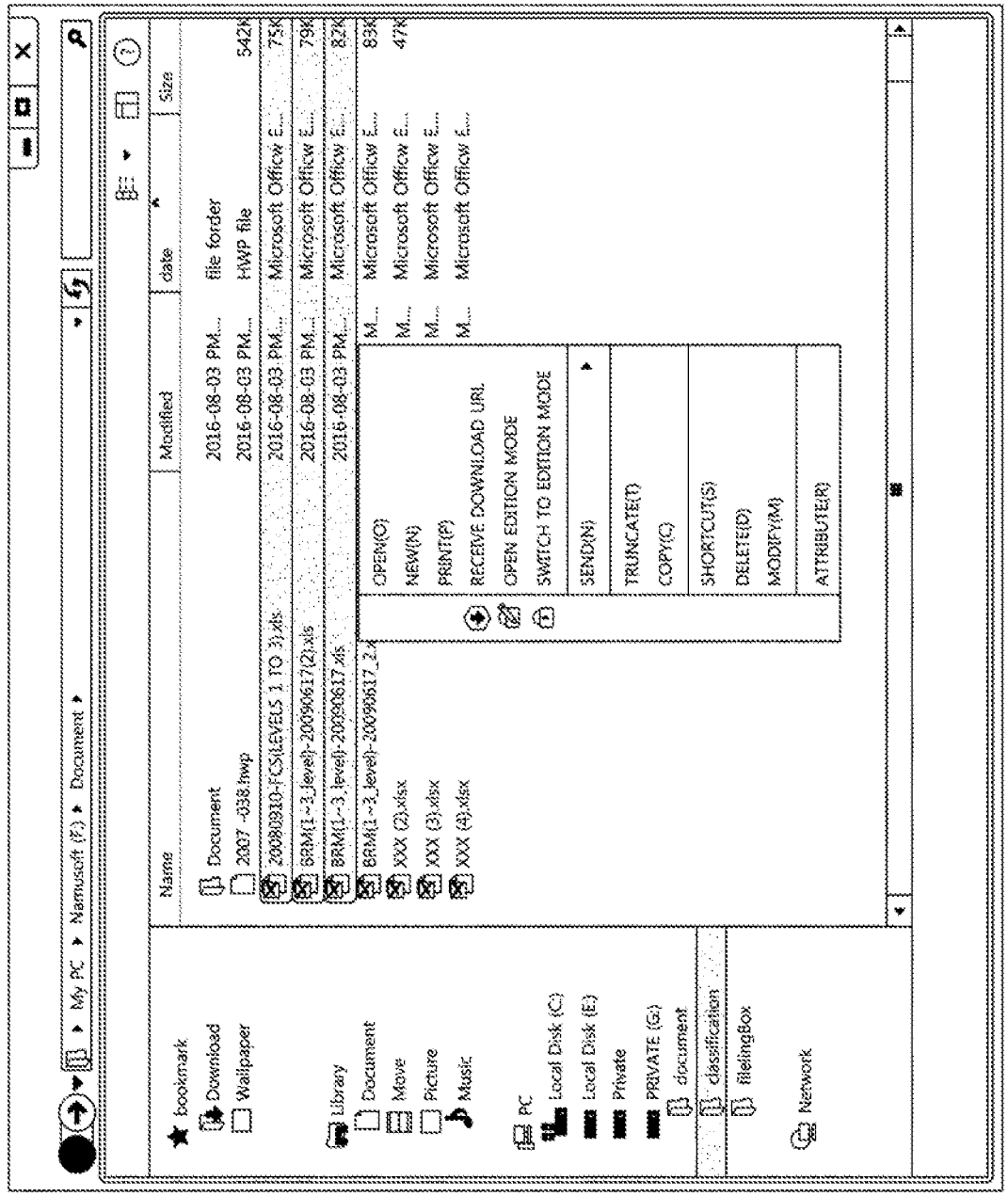
FIG. 7 is a screen example for a case where a user switches a specific file to 'edit mode open' or 'edit mode switching' after mounting a storage space of a storage device for preventing a phishing attack in a window explorer in a network drive.
Figure 8:
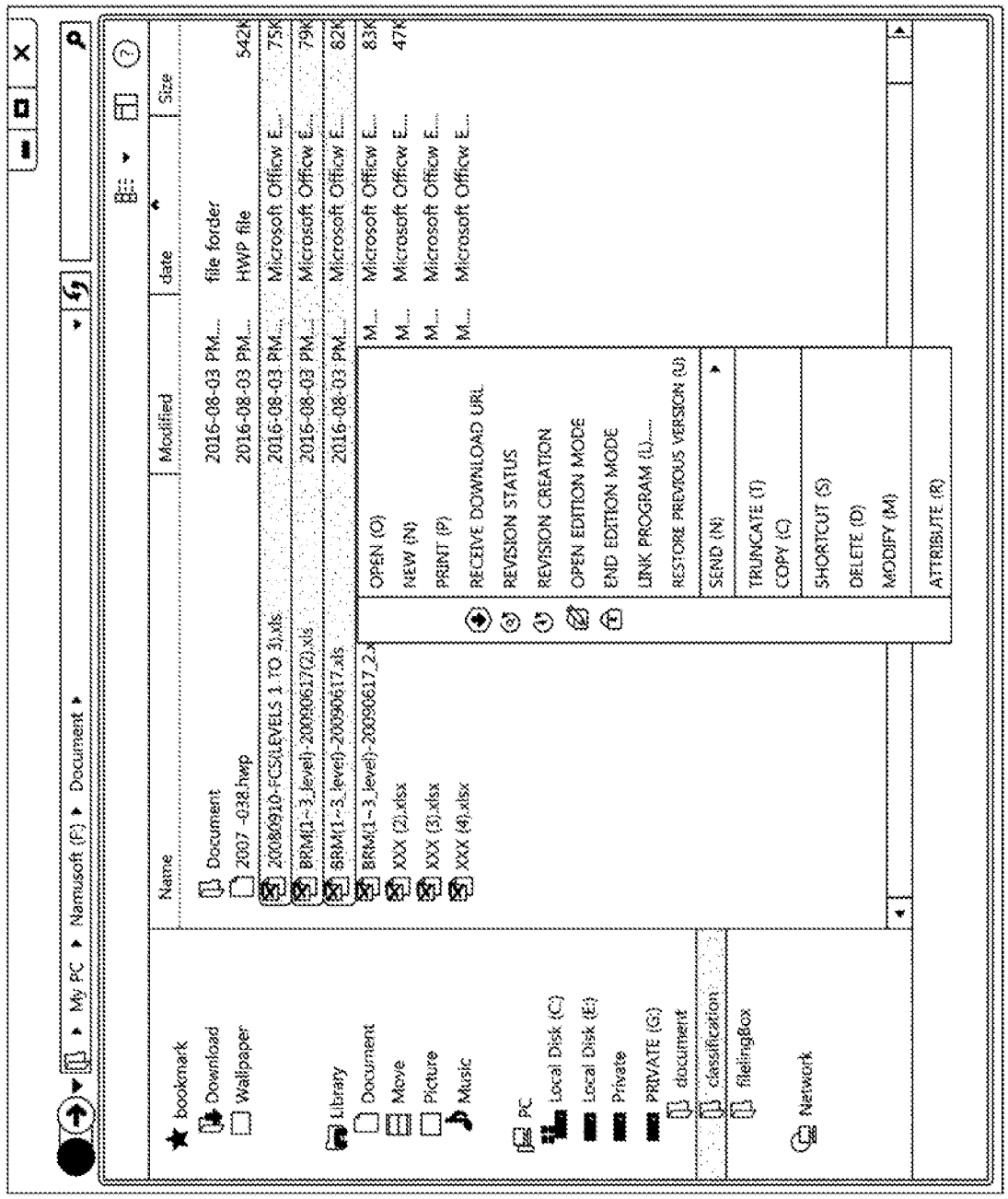
FIG. 8 is an execution screen example capable of transmitting an edit mode termination command when the edit mode of FIG. 7 is released.

Here, FIG. 7 is a screen example for a case where a user switches a specific file to 'edit mode open' or 'edit mode switching' after mounting a storage space of a storage device for preventing a phishing attack in a window explorer in a network drive and FIG. 8 is an execution screen example capable of transmitting an edit mode termination command when the edit mode of FIG. 7 is released.

Further, the processing such as the switching to the edit mode or/and the termination of the edit mode may also be performed per unit file, but in some cases, the processing such as the switching to the edit mode or/and the termination of the edit mode may be simultaneously performed in a plurality of files within a required range or a set range in driving the file. As one example, when reference files having sub folders need to be simultaneously accessed and used as in the case of CAD or a software development tool, even by switching to the edit mode/termination manipulation of the edit mode for any one file, all corresponding sub folders or reference files in the sub folder associated therewith will be enabled to be switched to the edit mode/ended.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for blocking a phishing attack comprising:
a phishing attack prevention storage device; and
an agent program which is installed in a user terminal or a service server and performs an interlocking operation with the phishing attack prevention storage device when the user terminal or the service server is connected with the phishing attack prevention storage device via a network and a storage area in the phishing attack prevention storage device is mounted in a network drive,
wherein when there is an open request for a real file stored in the storage area in the phishing attack prevention storage device from the user terminal or the service server,
the phishing attack prevention storage device checks a storage operation mode and creates a fake file other than the open-requested original file when the storage operation mode corresponds to a list-only mode to return the fake file to the user terminal or the service server via the network,
wherein the phishing attack prevention storage device is physically independent and separated from the user terminal or the service server.

2. The system for blocking the phishing attack of claim 1, wherein the fake file has the same file capacity as the original file to be open-requested, and a file text is filled with a null value or an unknown value.

3. The system for blocking the phishing attack of claim 2, wherein the agent program provides selection information to enable a user to select switching to an edit mode or termination of the edit mode with respect to a folder or file stored in the phishing attack prevention storage device mounted on the user terminal or the service server in a network drive format, and
requests a release of the list-only mode to the phishing attack prevention storage device when the file open request corresponds to an edit mode open request according to the switching to the edit mode, and
the phishing attack prevention storage device releases the list-only mode according to the edit mode open request and allows the open-requested original file to be provided to the user terminal or the service server.

4. The system for blocking the phishing attack of claim 2, wherein the agent program requests a release of the list-only mode to the phishing attack prevention storage device when there is a release request of the list-only mode according to a pre-registered mode from the user terminal or the service server,
the phishing attack prevention storage device allows the open-requested original file to be provided to the user terminal or the service server according to the release request of the list-only mode, and the release of the list-only mode is executed through an authority's authentication by an authentication device pre-registered from the user.

\* \* \* \* \*